United States Patent

Ban et al.

[11] Patent Number: 5,979,964
[45] Date of Patent: Nov. 9, 1999

[54] DOUBLE PIVOTING STOWABLE SEAT

[75] Inventors: Marcel Ban, Troy; Alan Sturt, W. Bloomfield, both of Mich.

[73] Assignee: Lear Corporation, Southfield, Mich.

[21] Appl. No.: 08/950,948

[22] Filed: Oct. 15, 1997

[51] Int. Cl.[6] .................................................. B60N 2/12
[52] U.S. Cl. .................... 296/66; 296/65.09; 296/65.13; 297/15
[58] Field of Search .................. 296/66, 65.01, 296/65.05, 65.09, 65.13, 65.14, 65.16; 297/15, 331

[56] References Cited

U.S. PATENT DOCUMENTS

| | | | |
|---|---|---|---|
| 1,933,623 | 11/1933 | Gordon | 296/76 |
| 3,151,906 | 10/1964 | Roberts | 296/66 |
| 3,202,453 | 8/1965 | Richards | 296/66 |
| 3,476,435 | 11/1969 | Hitzelberger | 296/65 |
| 3,746,389 | 7/1973 | Fourrey | 297/15 |
| 4,341,415 | 7/1982 | Braun et al. | 296/65 R |
| 4,699,418 | 10/1987 | Plavetich | 296/65 R |
| 4,869,541 | 9/1989 | Wainwright | 296/65.1 |
| 4,932,706 | 6/1990 | Wainwright et al. | 296/65.1 |
| 4,932,709 | 6/1990 | Wainwright | 296/65.1 |
| 5,116,097 | 5/1992 | Bulgari | 296/64 |
| 5,195,795 | 3/1993 | Cannera et al. | 296/65.1 |
| 5,240,302 | 8/1993 | Yoshida et al. | 296/65.1 |
| 5,269,581 | 12/1993 | Odagaki et al. | 296/66 |
| 5,280,987 | 1/1994 | Miller | 296/65.1 |
| 5,348,261 | 9/1994 | Nini | 248/430 |
| 5,360,272 | 11/1994 | Schmale et al. | 384/48 |
| 5,372,398 | 12/1994 | Aneiros et al. | 296/65.1 |
| 5,398,995 | 3/1995 | Hurite | 297/378 |
| 5,482,346 | 1/1996 | Lesourd | 296/66 |
| 5,492,386 | 2/1996 | Callum | 296/64 |
| 5,498,051 | 3/1996 | Sponsler et al. | 296/65.1 |
| 5,527,087 | 6/1996 | Takeda et al. | 297/15 |
| 5,611,589 | 3/1997 | Fujii et al. | 296/64 |
| 5,681,077 | 10/1997 | Hashimoto | 297/15 |
| 5,800,015 | 9/1998 | Tsuchiya et al. | 297/331 |
| 5,868,451 | 2/1999 | Uno et al. | 296/66 |

*Primary Examiner*—D. Glenn Dayoan
*Assistant Examiner*—Paul Chenevert
*Attorney, Agent, or Firm*—Brooks & Kushman P.C.

[57] ABSTRACT

A vehicle seat that is folded and stowed in a recess in the floor of a vehicle. A rear portion of the seat has shiftable elements that are received in tracks. The shiftable elements may be rollers that are detachable from the tracks. A front portion of the seat is supported by pivot connectors that the seat pivots about for stowing in the recess. Locking pins are received in a series of holes that permit fore and aft adjustment of the seat position.

7 Claims, 5 Drawing Sheets

DOUBLE PIVOTING STOWABLE SEAT

TECHNICAL FIELD

The present invention relates to a stowable vehicle seat.

BACKGROUND OF THE INVENTION

Passenger cars and vans are used to transport passengers and cargo. Passenger seats in vehicles tend to limit the cargo carrying capacity of the vehicle. Minivans and sport utility vehicles can be placed in various configurations with passenger seats being adapted to be converted from a passenger seat to a cargo carrying position. Generally, the vehicle seat back folds down over the lower seat. While this creates additional cargo carrying capacity, the folded seat back may be 12 to 18 inches above the floor of the passenger/cargo compartment.

Another approach to maximizing cargo carrying capacity in a minivan or sport utility vehicle is by providing detachable seats that can be removed from the vehicle leaving a clear, unobstructed cargo floor of maximum height. Conventional seats are heavy and unwieldy. Also, after the seats are removed from the vehicle, they must be stored outside of the vehicle typically in a crowded garage.

Yet another approach is to provide seats that are mounted to the floor of a vehicle on rollers that are received in tracks secured to the floor of the vehicle. In this approach, the seats may be either rolled forwardly or rearwardly in the vehicle so that they are adjacent to one another when folded down. Also, one or more rows of seats may be removed. These approaches suffer from some of the same disadvantages that were previously described.

The present invention is directed to solving the above problems.

SUMMARY OF THE INVENTION

The present invention provides a vehicle seat for a vehicle, such as a minivan or sport utility vehicle, that may be folded and pivoted into a recess formed in the floor of the vehicle to provide a full height cargo area of maximum cargo carrying capacity.

According to the invention, a seat is provided for a vehicle having a compartment that has a passenger configuration and a cargo carrying configuration. The compartment has a floor that defines a recess. Right and left wheel housings are provided on opposite sides of the floor. The seat includes a lower seat assembly having a front portion and a rear portion. A seat back assembly is pivotally connected to the lower seat assembly. A right rail is secured to the right wheel housing. The right rail defines a first channel having a first release aperture. A left rail is secured to the left wheel housing. The left rail defines a second channel having a second release aperture. A right side connector is disposed on the right rear portion of the lower seat assembly and is detachably received in the first channel of the right rail. A left side connector is disposed on the left rear portion of the lower seat assembly and is detachably received in the second channel of the left rail. A front pivot connector is secured to the front portion of the lower seat assembly. The front pivot connector has first and second shiftable elements secured to first and second flanges that extend from a bottom surface of the lower seat assembly. The first and second shiftable elements are received in the first and second channels of the right and left side rails, respectively.

The seat may be converted from the passenger configuration to the cargo carrying configuration by first pivoting the seat back onto the lower seat. The lower seat assembly is then moved to a position wherein the right and left side connectors are aligned with the first and second release apertures, respectively. The right and left side connectors are retracted from the right and left rails through the first and second release apertures, respectively. The lower seat assembly is then free to be pivoted about the front pivot connector with the seat back assembly folded onto the lower seat assembly. The seat back assembly is received in the recess formed in the floor of the vehicle and the bottom surface of the lower seat assembly is inverted and functions as a cover over the recess.

According to another aspect of the invention, the right and left side connectors may be formed as rollers. The rollers are preferably provided with retractable locking pins. The locking pins are adapted to be received in adjustment holes formed in the right and left rails to permit the seat to be positioned in a range of locations fore and aft on the vehicle. The retractable locking pins are retracted by actuating a lever which simultaneously disengages the retractable locking pins from the holes in the rails.

According to the present invention, the bottom surface of the seat that is downwardly facing when the seat is in the passenger configuration is reoriented in the cargo carrying configuration to a substantially horizontal plane and inverted so that it faces upwardly. The front portion of the lower seat assembly is elevated above the right and left rails when the seat is in the passenger configuration. After pivoting, however, the lower seat assembly is suspended from the front pivot connector below the right and left rails.

These and other advantages and objects of the present invention will be better understood in view of the attached drawings and the following detailed description of the invention.

BEST MODE FOR CARRYING OUT THE INVENTION

Figure 1:
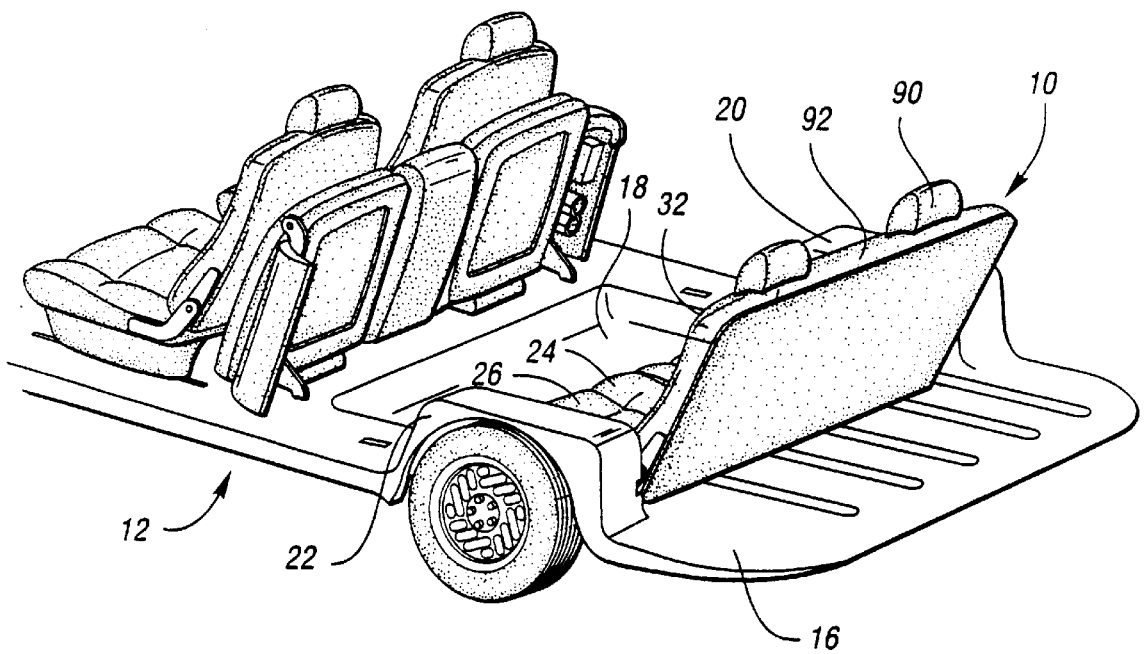
FIG. 1 is a fragmentary perspective view of the passenger compartment of a vehicle with rear seats in a passenger configuration.
Figure 2:
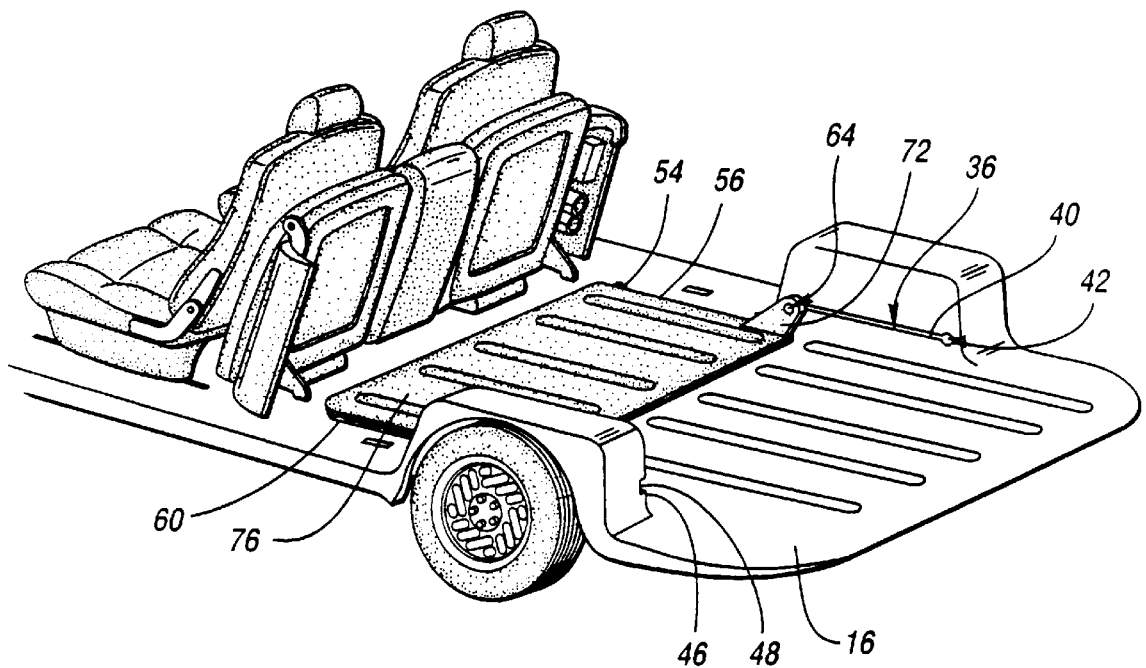
FIG. 2 is a fragmentary perspective view of the passenger compartment of a vehicle with the rear seats in a cargo carrying configuration.

Referring now to FIG. 1, a seat 10 for a vehicle 12 having a compartment that is converted between a passenger configuration and a cargo carrying configuration is shown. The compartment has a floor 16 that defines a recess 18. The floor 16 is flanked by a right wheel housing 20 and a left wheel housing 22.

The seat 10 is formed by a lower seat assembly 24 having a front portion 26 and a rear portion 28. A seat back assembly 32 is pivotally connected to the rear portion 28 of the lower seat assembly 24. The lower seat assembly 24 and the seat back assembly 32 are of conventional design including a frame and foam bun that are enclosed in seat covers.

As shown in FIGS. 2–7, a right rail 36 is secured to or formed as part of the right wheel housing 20. The right rail 36 defines a first channel 40 having a first release aperture 42. Left rail 46 is secured to or formed as part of the left wheel housing 22 and defines a second channel 48 which is similar in form and function to first channel 40. A right side connector 54 is located on the right side 56 of the rear portion 28 of the lower seat assembly 24. The right side connector 54 is detachably received in the first channel 40 of the right rail 36. Similarly, a left side connector 60 is disposed on the left side 62 of the rear portion 28 of the lower seat assembly 24. The left side connector 60 is detachably received in the second channel 48 of the left rail 46.

Referring to FIGS. 3, 4, 7 and 8, front pivot connectors 64 and 65 are secured to the front portion 26 of the lower seat assembly 24. Pivot connectors 64 and 65 may be formed as two separate members or as parts of a single rod. The front pivot connectors 64 and 65 include first roller element 68 and second roller element 70 that are mounted on first flange 72 and second flange 74 that extend from a bottom surface 76 of the lower seat assembly 24. The first and second roller elements 68 and 70 are received in the first and second channels 40 and 48, respectively. The right and left side connectors 54 and 60 and the first and second roller elements 68 and 70 are adapted to roll within the first and second channels 40 and 48.

Figure 5:
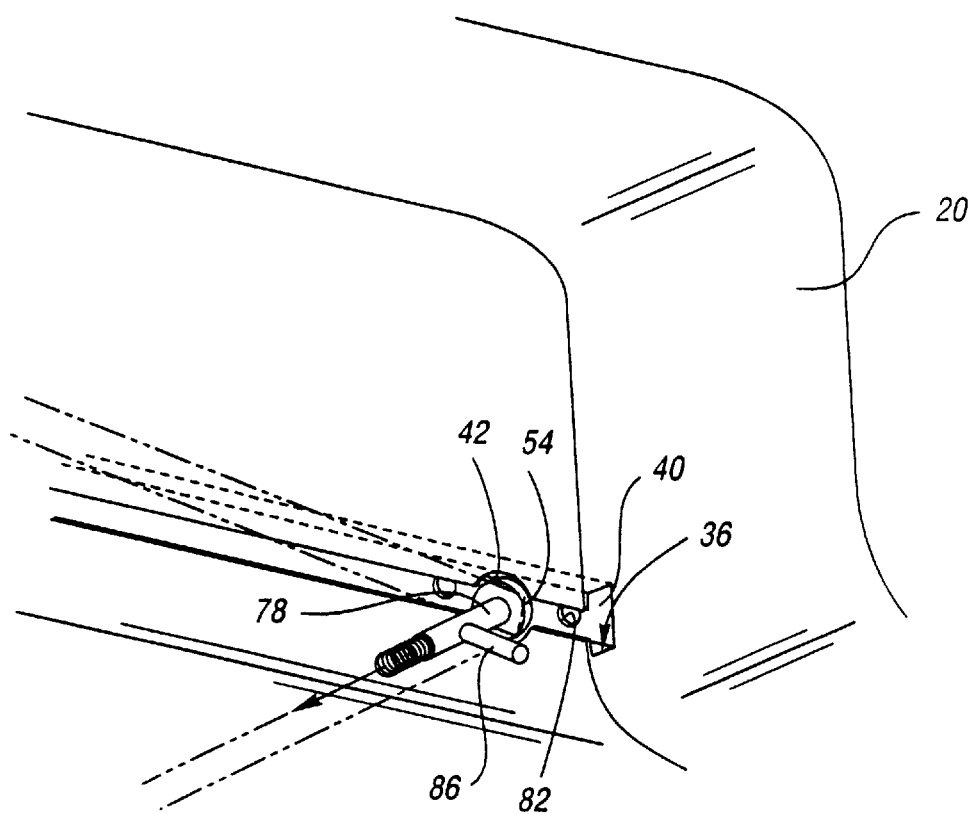
FIG. 5 is a fragmentary perspective view of the right side rail and connector made in accordance with the present invention.
Figure 6:
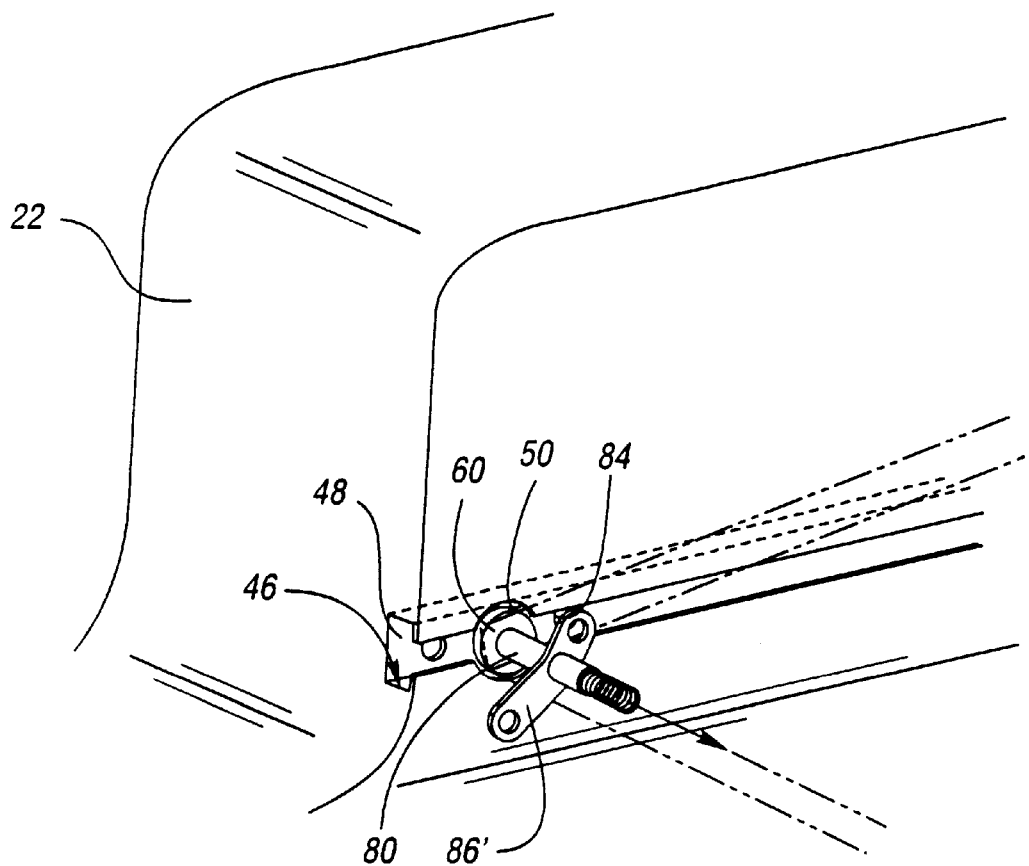
FIG. 6 is a fragmentary perspective view of the left side rail and connector made in accordance with the present invention.
Figure 7:
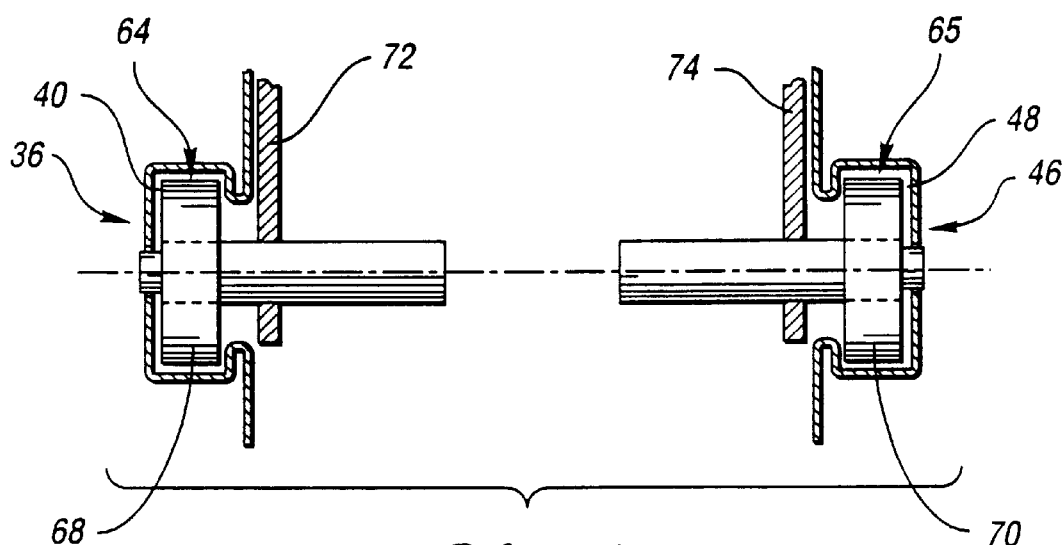
FIG. 7 is a fragmentary front elevation view partially in cross section showing the pivot connector and rails of a vehicle seat made in accordance with the present invention.
Figure 8:
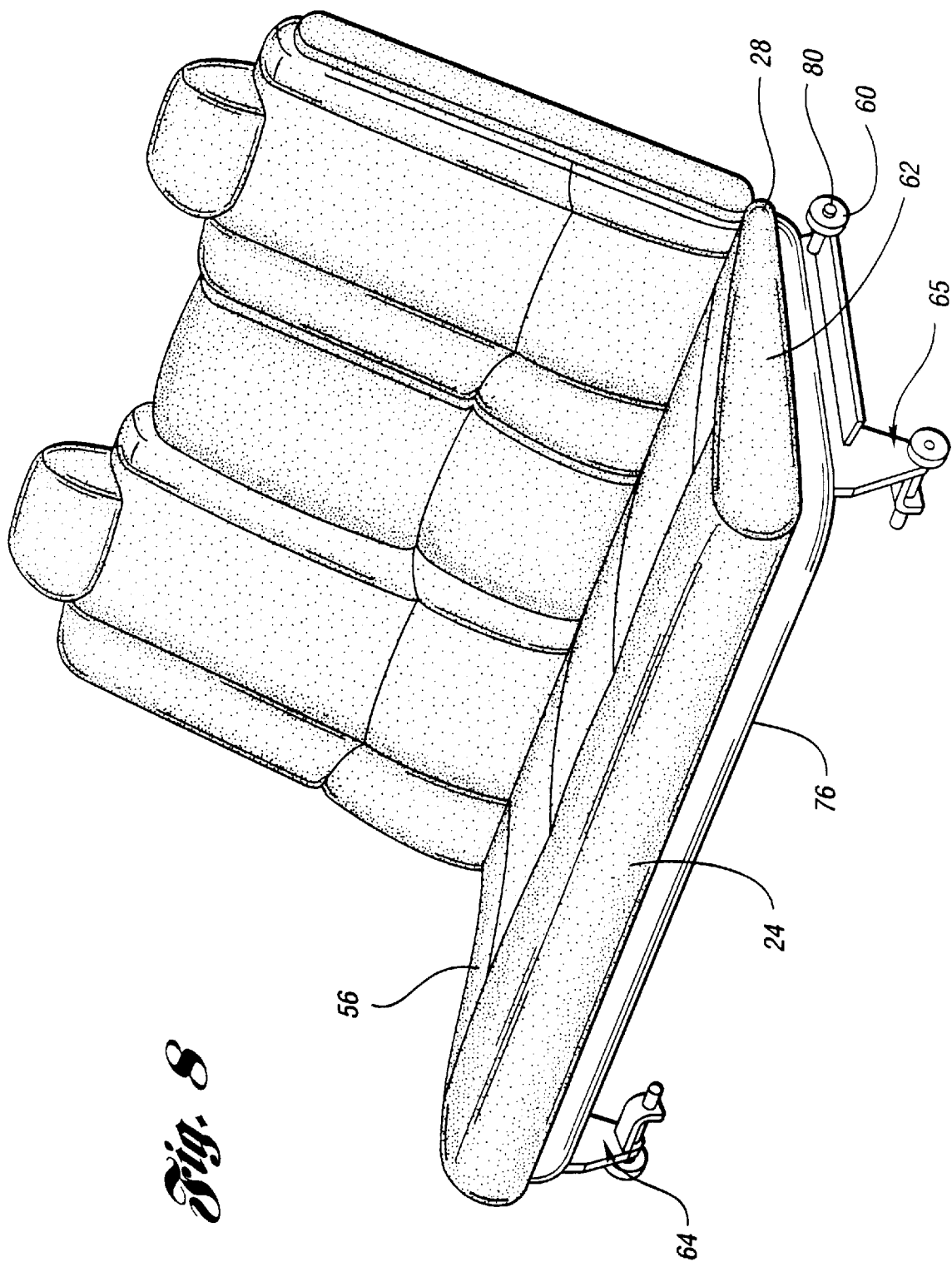
FIG. 8 is a perspective view of the vehicle seat made in accordance with the vehicle seat of the present invention.

Referring to FIG. 5 and 6, retractable locking pins 78 and 80 are provided on each of the right and left side connectors 54 and 60, respectively. Retractable locking pins 78 and 80 are adapted to be received in corresponding adjustment holes 82 and 84 formed on rails 36 and 46, respectively. Lever 86 and 86' are operatively connected to retractable locking pins 78 and 80 to selectively disengage pins 78 and 80 from the holes 82 and 84.

The seat 10 is converted from the passenger configuration to the cargo carrying configuration by pivoting the seat back assembly 32 onto the lower seat assembly 24. The lower seat assembly 24 is then moved to a position wherein the right and left side connectors 54 and 60 are aligned with the first and second release apertures 42 and 50. The right and left side connectors 54 and 60, when aligned with the first and second release apertures 42 and 50, are retractable to allow separation of the right and left side connectors 54 and 60 from the right and left rails 36 and 46. The lower seat assembly 24 is then pivoted with the seat back assembly folded thereon about the front pivot connectors 64 and 65 until the seat back assembly 32 is received in the recess 18 formed in the floor 16 of the vehicle 12. In this position, the bottom surface 76 of the lower seat assembly 24 is inverted so that it is upwardly facing.

The seat 10 is converted from the cargo carrying configuration to the passenger configuration by lifting the seat back assembly 32 and lower seat assembly 24 from the recess 18 by pivoting the lower seat assembly 24 about the front pivot connectors 64 and 65 until the right and left side connectors 54 and 60 are aligned with the first and second release apertures 42 and 50. Right and left side connectors 54 and 60 are then inserted into the rails 36 and 46 through the first and second release apertures 42 and 50. The position of the seat fore and aft can then be adjusted by shifting the lower seat assembly 24 until the retractable locking pins 78 and 80 are received in corresponding holes 82 and 84 on right and left rails 36 and 46.

Figure 3:
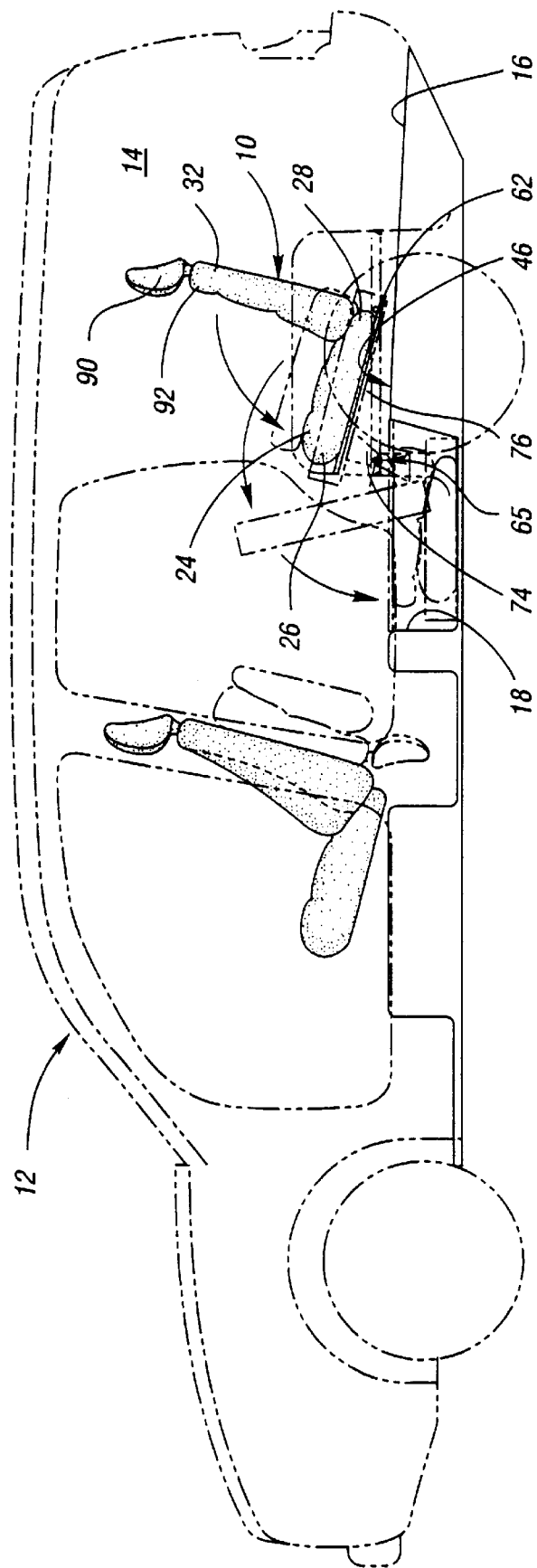
FIG. 3 is a side elevation view of a vehicle showing seats made in accordance with the present invention and showing the seats in a progression of positions between the passenger configuration and the cargo carrying configuration.
Figure 4:
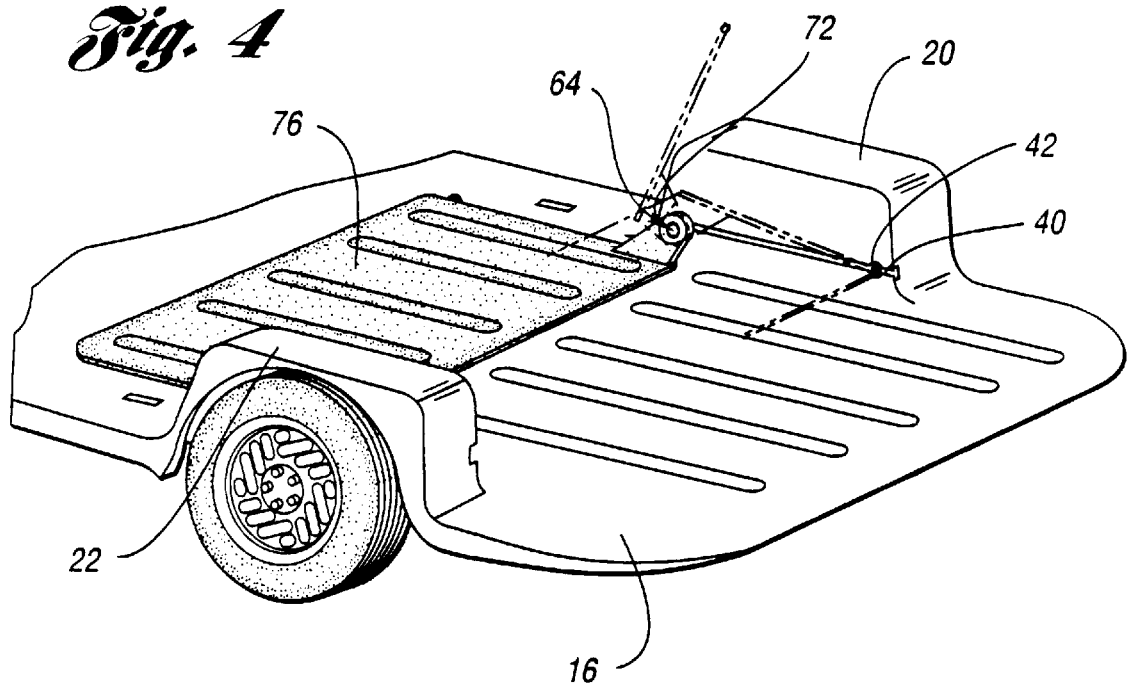
FIG. 4 is a fragmentary perspective view showing the rear seats in the cargo carrying configuration with phantom lines showing the pivoting motion of the vehicle seat.

Referring to FIGS. 1 and 3, one or more headrests 90 may be provided on the upper end 92 of the seat back assembly 32. The headrests are detachably secured to the seat back assembly in the passenger configuration. When it is desired to convert to the cargo carrying configuration, the headrests 90 are removed from the seat back assembly 32 and stowed in the sides of the compartment 14.

The preceding description of the best mode of carrying out the invention is provided by way of example and should not be read in a limiting sense. The broad scope of the present invention should be construed in accordance with the following claims.

What is claimed is:

1. A seat and a vehicle in combination, said vehicle having a compartment that has a passenger configuration and a cargo carrying configuration, the compartment having a floor that defines a recess and right and left wheel housings on opposite sides of the floor, said seat comprising:

a lower seat assembly having a front portion and a rear portion;

a seat back assembly pivotally connected to the lower seat assembly;

a right rail secured to the right wheel housing, said right rail defining a first channel having a first release aperture;

a left rail secured to the left wheel housing, said left rail defining a second channel having a second release aperture;

a right side connector disposed on the right side of the rear portion of the lower seat assembly and detachably received in the first channel of the right rail;

a left side connector disposed on the left side of the rear portion of the lower seat assembly and detachably received in the second channel of the left rail;

at least one front pivot connector secured to the front portion of the lower seat assembly, said front pivot connector having first and second rollers mounted on first and second flanges extending from a bottom surface of the lower seat assembly, said first and second rollers being received in the first and second channels, respectively; and said seat being converted from the passenger configuration to the cargo carrying configuration by pivoting the seat back assembly onto the lower seat assembly, moving the lower seat to a position wherein the right and left side connectors are aligned with the first and second release apertures, respectively, retracting the right and left side connectors toward each other from the right and left rails through the first and second release apertures, pivoting the lower seat assembly with the seat back assembly folded thereon about at least one front pivot connector until the seat back assembly is received in the recess formed in the floor of the vehicle and the bottom surface of the lower seat assembly is inverted.

2. The seat and vehicle combination of claim 1 wherein said right and left side connectors are rollers.

3. The seat and vehicle combination of claim 1 further comprising retractable locking pins with one being provided on each of the right and left side connectors.

4. The seat and vehicle combination of claim 3 wherein two sets of adjustment holes are provided on the right and left rails.

5. The seat and vehicle combination of claim 4 wherein a lever is operatively connected to the retractable locking pins for disengaging the pins from the holes.

6. The seat and vehicle combination of claim 1 wherein the bottom surface is oriented in a substantially horizontal plane when the seat is in the cargo carrying configuration.

7. The seat and vehicle combination of claim 1 wherein the front portion of the lower seat assembly is elevated above the right and left rails in the passenger configuration and, after pivoting to the cargo carrying configuration, is carried below the right and left rails.

* * * * *